United States Patent
O'Neill et al.

(10) Patent No.: US 7,434,216 B1
(45) Date of Patent: Oct. 7, 2008

(54) UPDATE PACKAGE GENERATOR THAT EMPLOYS GENETIC EVOLUTION TO DETERMINE BANK ORDER

(75) Inventors: Patrick O'Neill, Dana Point, CA (US); Patrick C. Lilley, Irvine, CA (US); LaShawn McGhee, Temecula, CA (US); Brian O'Neill, Dana Point, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 756 days.

(21) Appl. No.: 10/721,658

(22) Filed: Nov. 25, 2003

Related U.S. Application Data

(60) Provisional application No. 60/428,848, filed on Nov. 25, 2002.

(51) Int. Cl.
*G06F 9/44* (2006.01)

(52) U.S. Cl. .............. 717/169; 717/168; 717/172; 717/174; 717/175; 711/158; 711/217

(58) Field of Classification Search ......... 717/168–178; 711/216, 217, 158
See application file for complete search history.

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |
| 5,960,445 A | 9/1999 | Tamori et al. | 707/203 |
| 6,009,497 A | 12/1999 | Wells et al. | 711/103 |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |

(Continued)

FOREIGN PATENT DOCUMENTS

CA 2339923 3/2000

(Continued)

*Primary Examiner*—Lewis A. Bullock, Jr.
*Assistant Examiner*—Michael Yaary

(57) ABSTRACT

Disclosed herein is an update package generator which may employ a bank order determination module to determine an optimum bank order of memory banks of a binary image of at least one of firmware and software. The bank order may subsequently be employed in generation of an update package, wherein the size of the update package generated by the generator may be minimized. A bank order determination unit may selectively employ one of genetic algorithms and differential evolution techniques to determine an optimum bank order. Other parameters may also be employed in the generator. The generator may also be selectively optimized to employ at least one genetic evolution technique.

21 Claims, 3 Drawing Sheets

U.S. PATENT DOCUMENTS

Figure 1:
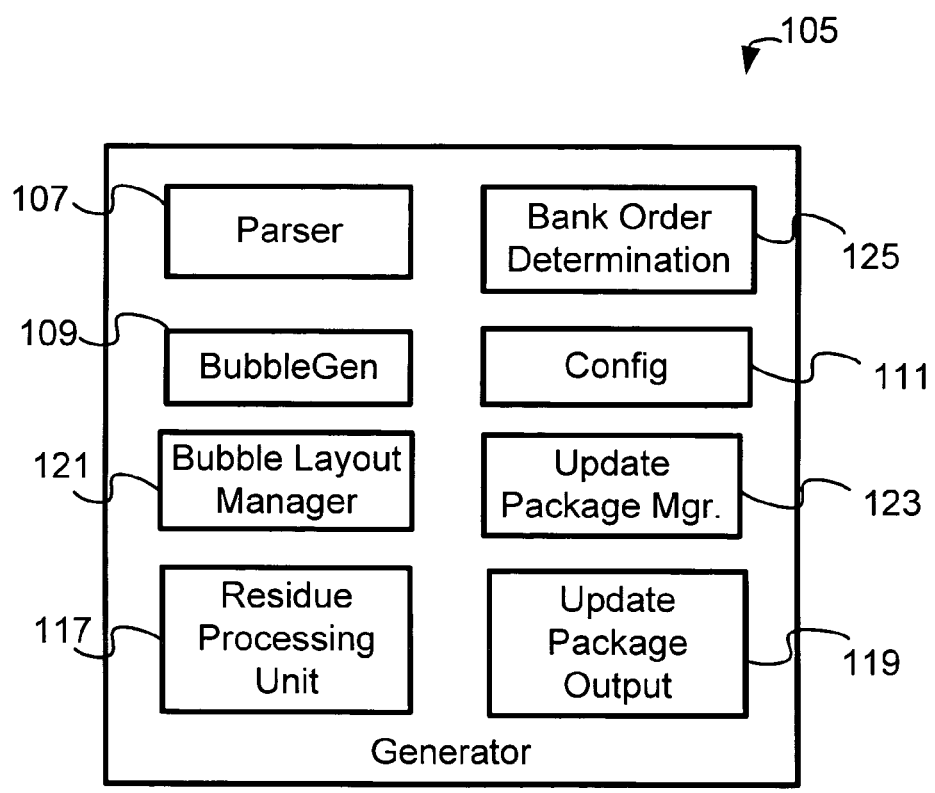

| | | | |
|---|---|---|---|
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,651,249 B2 * | 11/2003 | Waldin et al. | 717/170 |
| 6,775,423 B2 * | 8/2004 | Kulkarni et al. | 382/305 |
| 6,823,432 B2 * | 11/2004 | Chen et al. | 711/158 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2004/0040020 A1 * | 2/2004 | Yang | 717/168 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

* cited by examiner

UPDATE PACKAGE GENERATOR THAT EMPLOYS GENETIC EVOLUTION TO DETERMINE BANK ORDER

CROSS-REFERENCE TO OTHER APPLICATIONS

The present application claims the benefit of priority of U.S. Provisional Patent Application having Ser. No. 60/428,848, filed on Nov. 25, 2002, the complete subject matter of which is hereby incorporated herein by reference in its entirety.

The present application also incorporates herein by reference the complete subject matter of PCT application having publication number WO/02/41147 A1, and having application number PCT/US01/44034, filed on Nov. 19, 2001, in their respective entireties.

The present application also incorporates herein by reference the complete subject matter of U.S. Provisional Application 60/415,620, filed Oct. 2, 2002, and U.S. Provisional Application having Ser. No. 60/405,253, filed Aug. 22, 2002, in their respective entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices often contain firmware and application software that may be either provided by the manufacturers of the electronic devices, by telecommunication carriers, or by third parties. These firmware and application software often contain software bugs. New versions of the firmware and software are periodically released to fix the bugs, to introduce new features, or both.

The electronic devices may be constrained in terms of resources, such as available memory. Attempts to upgrade firmware or software by end-users often results in making the device, or some features of the device, inoperable. Changing firmware in electronic devices requires care, as unsuccessful attempts may result in making the device inoperable.

Generating update packages that are helpful in changing firmware in electronic devices requires an appreciation of the problems of applying the generated update packages in electronic devices, as such attempts to upgrade firmware and/or software in constrained devices are often hampered by limited user interaction capabilities and slow communication speeds on these devices.

Determination of the version of firmware and/or software currently being executed on an electronic devices is challenging, especially if such determination is made without requiring any (or minimal) end-user interaction.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a system for generating difference information between a first binary image of an electronic device and a second binary image of the electronic device. The system may comprise a bank order determination unit adapted to selectively employ differential evolution techniques to determine a bank order.

In an embodiment of the present invention, wherein the first binary image and the second binary image may comprise one of firmware and software present in memory banks of the electronic device. In addition, the bank order determination unit mat employ genomes to represent bank orders of memory banks of the electronic device.

In an embodiment of the present invention, the bank order determination unit may employ genomes to represent other additional parameters. The system may also determine optimum values employing differential evolution techniques for the bank order and the additional parameters.

In an embodiment of the present invention, the additional parameters for which optimum values may be determined are associated with at least one of RLE instructions, CPY instructions, DUP instructions, and other instructions.

In an embodiment of the present invention, the system may comprise an evolve population module which may be employed to evolve a population of genomes by one generation. The evolve population module may evaluate the population and sort the population before evolving the population to a next generation. The evolve population module may also selectively create cross-over genomes in accordance with an evolution process and may store the cross over genomes for subsequent processing.

Aspects of the present invention may be found in a method for generating an update package comprising difference information and being employable to update at least one of firmware and software in an electronic device. The method may comprise determining a bank order for generation of the difference information and employing the bank order in generation of the update package and in updating at least one of firmware and software in the electronic device, wherein the bank order may be an optimal bank order and determining an optimal bank order may involves employing genetic computation techniques comprising at least one of creating a new population of genomes, evaluating the population of genomes, and evolving the population of genomes. Evaluating and evolving the population of genomes may be repeated until at least one of a threshold is reached, a user cancels a generation run, and a determination is made that no other results may be found.

In an embodiment of the present invention, the method may also comprise creating a new population, wherein creating the new population comprises adding seeds to the population, and filling the population with random genomes, the seeds comprising at least one of a forward bank order seed and a backward bank order seed.

In an embodiment of the present invention, creating a new population may at least comprise seeding the population of genomes by building a forward bank order for a required number of banks, selectively storing a CRC value for the bank order for subsequent access, placing the forward bank order into the genomes, building a reverse order of banks, storing the CRC value for the reverse bank order, and placing the reverse order into the genomes.

In an embodiment of the present invention, evaluating the population may further comprises testing for a best desired outcome.

In an embodiment of the present invention, evaluating the population may comprise one of determining weights for the genomes, determining some evaluation function, and employing the evaluation function to compare and selectively order the genomes in the population.

In an embodiment of the present invention, evolving the population may comprise mating parents to create one of crossover genomes and mutated genomes, and filling the population with new random genomes.

In an embodiment of the present invention, during evolving the population of genomes, two elites may be employed as parents for a new genome and a crossover technique may be employed by the bank order determination unit, after ensuring that the two elites employed as parents are not identical.

In an embodiment of the present invention the parent genomes may be mated by mixing parent genome bank order weights respectively.

In an embodiment of the present invention, an elite genome and a non-elite genome may be employed as parents for a new genome.

In an embodiment of the present invention, two genomes comprising one of elite and non-elite genomes may be randomly selected as parents to create a new genome.

Aspects of the present invention may be found in a method for generating update packages for updating at least one of firmware and software in a mobile handset. The method may comprise determining a bank order, determining values for generation parameters, and generating the update package incorporating the bank order.

In an embodiment of the present invention, the method may further comprise determining a bank order employing at least one genetic evolution technique, determining values for generation parameters employing the at least one genetic evolution technique, and generating the update package incorporating the bank order.

In an embodiment of the present invention, generating update packages further comprises incorporating verification information in a generated update package facilitating integrity checking in a mobile handset receiving the update package.

In an embodiment of the present invention, generating update packages further comprises incorporating authentication information in a generated update package facilitating authentication of a source of the update package in a mobile handset receiving the update package.

In an embodiment of the present invention, generating update packages further comprises incorporating information in a generated update package facilitating fault tolerant update in a mobile handset receiving the update package.

These and various other advantages and features of novelty which may characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DIAGRAMS

Figure 2:
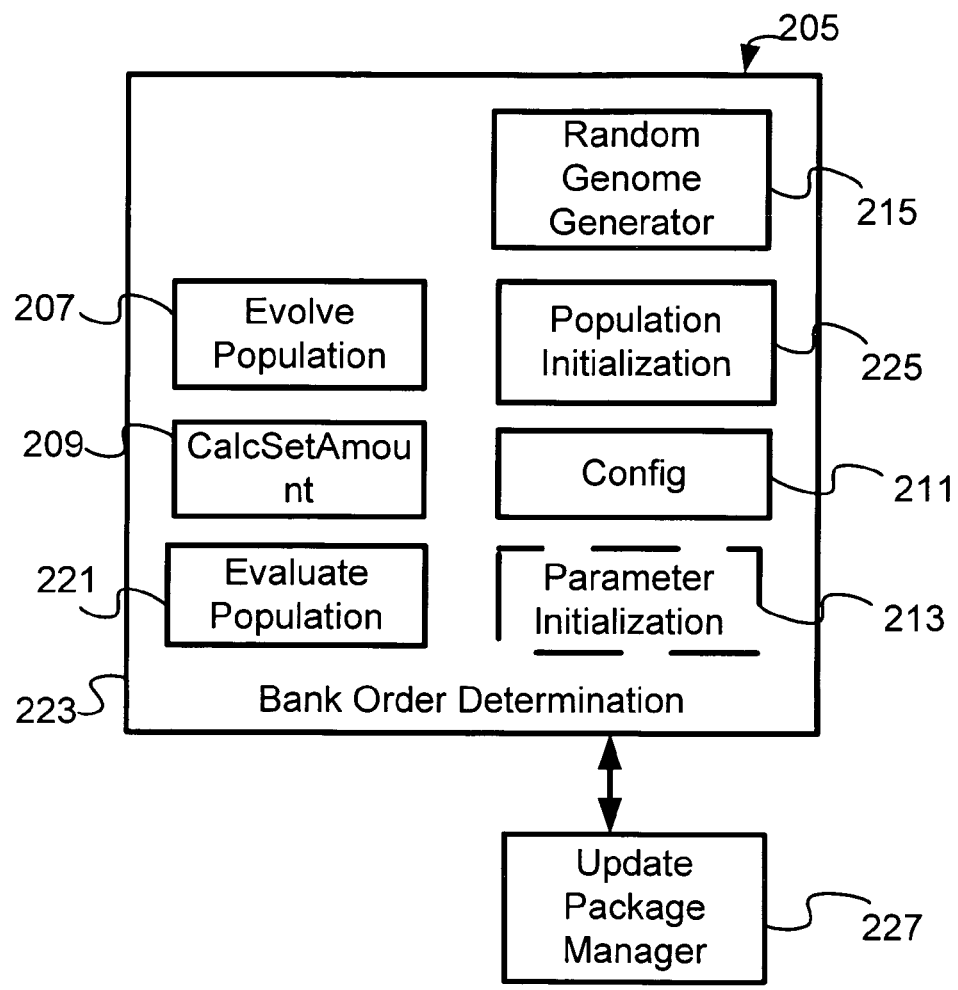
Figure 3:
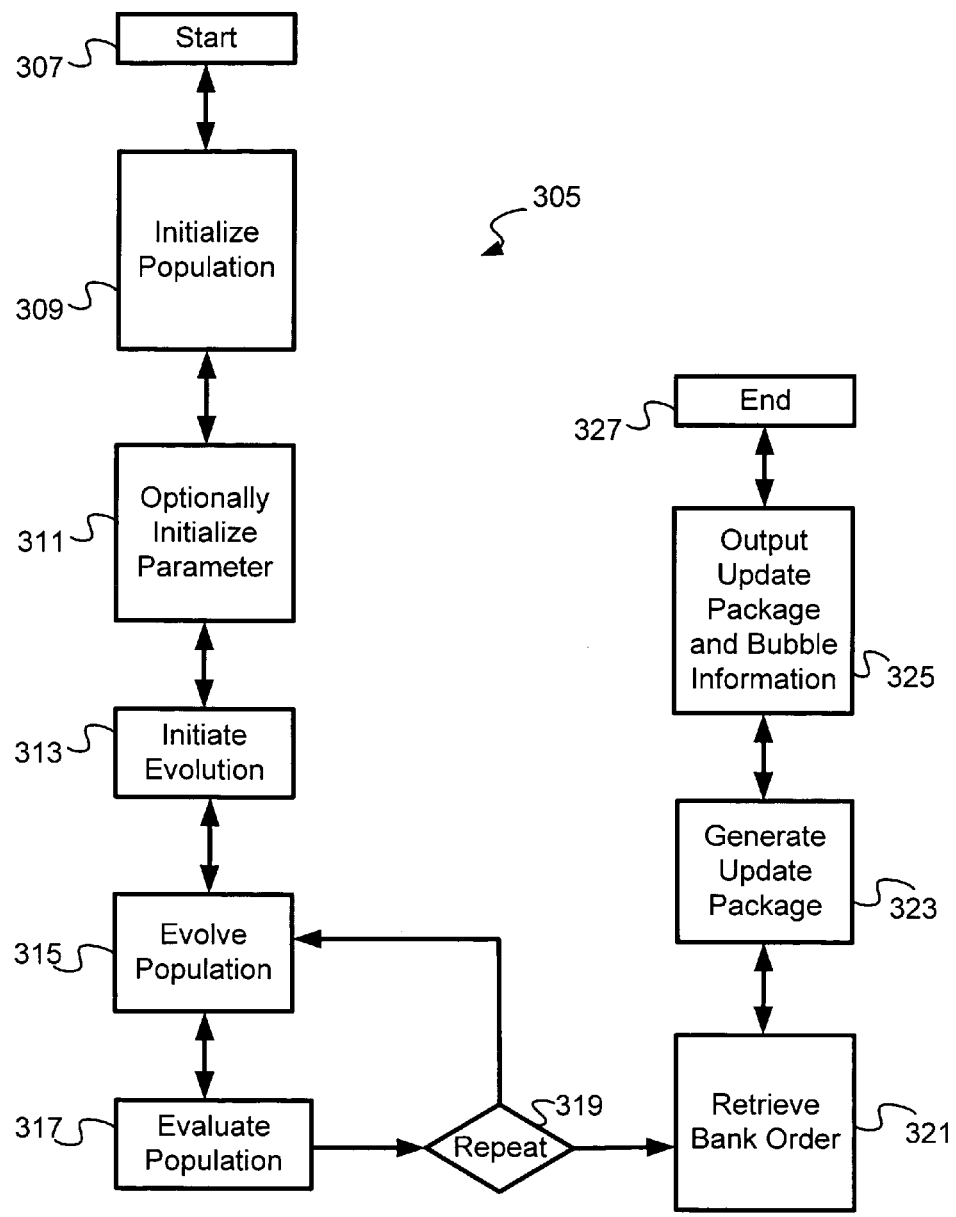

FIG. 1 is a block diagram illustrating an update package generator employing genetic evolution to determine a bank order according to an embodiment of the present invention;

FIG. 2 is a block diagram illustrating a bank order determination unit that may be employed by a generator to determine optimum bank orders of memory banks according to an embodiment of the present invention; and FIG. 3 is a flow chart illustrating an exemplary process for generation of update packages by a generator comprising a bank order determination unit employing genomes and genetic techniques to generate an optimum bank order of memory banks according to an embodiment of the present invention.

DETAILED DESCRIPTION OF THE DIAGRAMS

FIG. 1 is a block diagram illustrating an update package generator employing genetic evolution to determine bank order according to an embodiment of the present invention. In FIG. 1 an update package generator that may employ genetic evolution to determine bank order 105, that may be used to generate efficient and compact update packages. The generator may comprise a parser 107, a BubbleGen 109, a configuration manager 111, a bubble layout manager 121, a residue processing unit 117, a bank order determination module 125, an update package manager 123, and an update package output 119.

The process of generating an update package employing the update package generator 105 for firmware/software that are embedded in electronic devices may involve processing two different versions of the images of the firmware/software, determining how the versions differ and generating the update package in the required format. To make the update package compact, as well as efficient, an optimum bank order may be determined employing at least one genetic evolution technique, which may also sometimes be referred to as differential evolution techniques. Other parameters employed in the generator may also be optimized using at least one genetic evolution technique.

The parser 107 may be applied for parsing binary images, 'elf' files, or executable images before processing. In an embodiment of the present invention, the parser 107 may be used to determine the location of symbols and the values of offsets for branch link instructions, load instructions, pointers, etc. The parser 107 may also be employed to generate distance files, i.e. files comprising 'distance values', one for the existing image of a software/firmware of an electronic device, and another for the new image of a software/firmware of the electronic device.

In an embodiment of the present invention, the parser 107 may be employed to pre-process ".map" files and ".sym" files to generate a ".dist" file. The ".dist" files may be generated for both the source (existing versions) and target (new or different versions) binary image files of software/firmware for an electronic device.

The generator 123 may selectively employ the residue processing unit 117 to generate compact segments of SET instructions forming part of a generated update package for the software/firmware for the electronic device. The update package output 119 may be employed to save the generated update package into a file, external device, an output stream, etc., selectively employing XML or some other formats, as appropriate.

The generator 105 may employ the bank order determination module 125 to determine an optimum bank order of memory banks of the binary image of a firmware/software, such a bank order may subsequently be employed in the generation of an update package, wherein the size of the update package generated by the generator may be minimized. The bank order determination unit 125 may selectively employ genetic algorithms and/or differential evolution technique to determine an optimum bank order.

In an embodiment of the present invention, the generator 105 may employ the bank order determination module 125 to optimize other generator parameters, for example, such as default lengths of run length encoding (RLE) instructions, default threshold values for copy segment sizes employed in CPY instructions, etc.

FIG. 2 is a block diagram illustrating a bank order determination unit that may be employed by a generator to determine optimum bank orders of memory banks according to an embodiment of the present invention. In FIG. 2 optimum bank orders may subsequently be employed in the generation of small update packages by the generator. The bank order determination unit 205 may comprise an evolve population module 207, a CaclSETAmount module 209, an evaluate population module 221, a random genome generator module 215, a population initialization module 225, a configuration module 211, and an optional parameter initialization module 213.

The bank order determination unit 205 may selectively employ differential evolution techniques to determine the bank orders. In an embodiment of the present invention, the bank order determination unit 205 may employ genomes to represent bank orders of memory banks of an electronic device comprising firmware and/or software in the memory banks. In an embodiment of the present invention, the bank order determination unit 205 may employ genomes to not only represent bank orders but also other parameters, for example, such as those associated with RLE instructions, CPY instructions, DUP instructions, etc.

A new random genome may be selectively created employing the random genome generator module 215. The random genome generator module 215 is adapted to set random weights for each bank, given a memory bank order comprising a set number of banks. The random genome created may be subjected to "evolution" over several generations to determine a final bank order.

A genome that is genetic offspring of specific genomes in the current population may be selectively created by the crossover genome module based upon one of a plurality of possible cross-over types, for example, two parent genomes may be employed for crossover. Selection of parent genomes from among a plurality of candidate genomes may follow a selection criteria, for example, such a selection criteria may be selectively specified by configuration module 211. For example, an exemplary selection criteria for choosing two elite (elites are considered to be outstanding based upon computed weights and/or some other distinguishing features) genomes as parents may be the selection of the two highest ordered genomes from an ordered list of candidate genomes. Other selection criteria for selecting parents are also contemplated.

In an embodiment of the present invention, two elites may be employed as parents for a new genome, and a crossover technique may be employed by the bank order determination module 205 for such creation, and upon ensuring that both parents are not the same, i.e., identical. The parent genomes may be mated by mixing their respective bank order weights. In an embodiment of the present invention, an elite genome and a non-elite genome may be employed as parents for a new genome. In an embodiment of the present invention, for example, two genomes, elite or non-elite, may be randomly selected as parents to create a new genome.

The evolve population module 207 may be employed to evolve a population of genomes by at least one generation. The population may be evaluated and sorted before evolving the population to subsequent generations. The genomes in the current population may be sorted by bank order before evolution is executed. Crossover genomes may be selectively created as part of the evolution process and such crossover genomes may be stored for subsequent processing.

In an embodiment of the present invention, the evaluate population module 221 may be selectively employed to determine the amount of VSET data (a virtual SET data) for each genome. The amount of VSET data may determine the weight of the genome. The evaluate population module may employ a CaclSETAmount module 209 to determine the VSET size created by a given bank order, for example, as specified by a genome. The evaluate population module 221 is adapted to compute the amount of VSET data in bytes of data that would be created if the associated bank order is employed for generating an update package. The CaclSETAmount module 209 may employ a bank order translation array for faster and efficient calculations. The CaclSETAmount module 209 loops thorough a copy database and calculates left over data from the copies while also evaluating whether the copies are good or bad copies. The CaclSETAmount module 209 also accrues the total amount of number of bytes associated with bad copies and processes them as candidates for a SET command. The accrued total amount may be reported as a VSET amount.

In an embodiment of the present invention, the random genome generator 215 may create a new genome instance and populate the bank order information with default values and the associated weights with a random number between 1 and 1000.

In an embodiment of the present invention, the population initialization module 225 may selectively seed a population of genomes employing some existing genomes and may selectively create the rest of the population with randomly created genomes employing the random genome generator 215. Seeding the population of genomes may comprise building a forward order for the required number of banks, selectively storing a CRC value for the bank order for subsequent access, placing the forward order into the genomes, building a reverse order of banks, storing the CRC value for the reverse bank order, and placing the backward order into the genomes.

In an embodiment of the present invention, the evolve population module 207 sorts all genomes in the current population by bank order and begins the evolution of the genomes during which the evolve population module 207 may selectively retain some genomes from the current population for the next generation, selectively create crossover genomes employing existing genomes, and selectively create random genomes.

In an embodiment of the present invention, the bank order determination module 223 may generates new generations of genomes until a threshold for generation improvement is exceeded, or until the bank order determination module 223 determines that no other results are necessary to be generated.

Generating optimum bank order may at least comprise:
1. Creating a new population:
   a. Adding Seeds to the population (forward, backward); and
   b. Filling the population with random genomes.
2. Evaluating the population:
   a. Testing for best desired outcome (for example, smallest VSET).
3. Evolving the population:
   a. Mate parents to create crossover/mutated genomes; and
   b. Fill with new random genomes.
4. Repeat steps 2 thru 3 above until one of the following occurs:
   a. It is determined that there are no other results to be found;
   b. A threshold is reached; and
   c. A user has canceled this generation run.

FIG. 3 is a flow chart illustrating an exemplary process for generation of update packages by a generator comprising a bank order determination unit employing genomes and genetic techniques to generate an optimum bank order of memory banks according to an embodiment of the present invention. In FIG. 3, at block 307, processing starts and the configuration of the population may be determined and the binary images of the firmware/software may be processed to generate parsed data adapted for further analysis.

At block 309, the population of genomes may be created and initialized. Creating a new population of genomes typically involves creating genomes by adding seed genomes to the population (forward, backward) and by filling the population with some random genomes.

At block 311, some parameters that effect the generation of update packages by a generator may be initialized. For example, in an embodiment of the present invention, parameters such as run length encoding (RLE) threshold, copy instruction (CPY) default threshold, duplication instruction (DUP) threshold length, etc., may also be incorporated into the genetic techniques and optimum values and may also be selectively determined by the genetic techniques. The values for these parameters may be seeded in each genome and the evolution of the genomes may also effect the values of these parameters in the genomes.

At block 313, evolution of the genomes may be initiated and the initialization of genomes completed. At block 315, evolution of the population of genomes may be executed. Evolution of the genome population may comprise mating target parents to create crossover/mutated genomes and creating new random genomes during each generation step. At block 317, the population of genomes may be evaluated. Evaluation may comprise determining the weights for the genomes and/or determining an evaluation function that may be employed to compare and selectively order the various genomes in the population. For example, in an embodiment of the present invention, evaluating the population may involve testing for the best desired outcome (for example, smallest VSET).

At block 319, an attempt may be made to determine whether generation of additional generations of genomes may be terminated. If it is determined that the bank order determination is not complete and additional generation of genomes need to be generated in the population, then control may be transferred back to block 315 for further evolution. If it is determined that additional generation of genomes will not produce further results, or if the bank order is determined to be optimum, then control may be transferred to block 321 and the generated bank order may be retrieved. Execution of blocks 315, 317 and 319 may be repeated until one of the following occurs; a determination is made that there are no other results to be found; a threshold is reached; or the user cancels the generation run.

At block 323, an update package may be generated. The generated updated package and associated information, for example, such as bubble information, may be output and processing may be terminate at block 327.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and appended diagrams. It is intended that the scope of the invention be limited not with this detailed description but rather by the claims appended hereto.

What is claimed is:

1. A system for generating difference information between a first binary image of an electronic device and a second binary image of the electronic device, the system comprising:
   a bank order determination unit adapted to employ at least one differential evolution technique to determine a bank order of updating electronic device memory comprising a plurality of banks, the bank order determination unit adapted to employ genomes to represent bank orders of memory banks of the electronic device and to represent other additional parameters;
   wherein the first binary image and the second binary image comprise at least one of firmware and software in memory banks of the electronic device;
   wherein the system is adapted to determine optimum values for the bank order and other additional parameters employing the at least one differential evolution technique, the optimum values for the bank order and other additional parameters making the update package compact to the greatest degree attainable by the system; and
   wherein the determined bank order and the difference information are transmitted to and processed by the electronic device to update memory in the electronic device.

2. The system according to claim 1, wherein the other additional parameters are selected from instructions associated with at least one of run-length encoding (RLE) instructions, copy (CPY) instructions, and duplicate (DUP) instructions.

3. The system according to claim 2, further comprising an evolve population module adapted to evolve a population of genomes by at least one generation, wherein the evolve population module is also adapted to evaluate the population and sort the population before evolving the population to subsequent generations, and the evolve population module is adapted to selectively create crossover genomes as part of an evolution process and store the crossover genomes for subsequent processing.

4. A method for generating an update package comprising difference information for updating at least one of firmware and software in memory of an electronic device, the memory comprising a plurality of banks, the method comprising:
   determining an optimal bank order for processing images of the memory during generation of difference information, using at least one differential evolution technique employing at least one genetic computation technique comprising:
      creating a new population of genomes;
      evaluating the population of genomes;
      evolving the population of genomes; and
      repeating evaluating and evolving the population at least until:
         a determination is made that there are no other results to be found,
         a threshold is reached, or
         a user cancels generation of the genomes;
   employing the optimal bank order to generate the update package; and
   wherein the optimal bank order makes the update package compact to the greatest degree attainable by the method.

5. The method according to claim 4, wherein creating a new population comprises:
   adding seeds to the population of genomes, the seeds comprising at least one of a forward bank order seed and a backward bank order seed; and
   filling the population with randomly created genomes.

6. The method according to claim 4, wherein creating a new population comprises:
   seeding the population of genomes by building a forward bank order for a required number of banks;
   selectively storing a CRC value for the forward bank order for subsequent access;
   placing the forward bank order into the genomes;
   building a reverse order of banks;
   storing the CRC value for the reverse bank order; and
   placing the reverse order of banks into the genomes.

7. The method according to claim 4, wherein evaluating the population of genomes comprises testing for a best desired outcome.

8. The method according to claim 7, wherein evaluating the population of genomes further comprises at least one of determining weights for the genomes and determining an evaluation function adapted to be employed to compare and selectively order the genomes in the population.

9. The method according to claim 4, wherein evolving the population of genomes comprises:
   mating parents to create at least one of crossover and mutated genomes; and
   filling the population of genomes with randomly created genomes.

10. The method according to claim 4, wherein, during the evolving of the population of genomes, two elite genomes are employed as parents for a new genome and a crossover technique is employed by the bank order determination unit after ensuring that both parents are not identical.

11. The method according to claim 10, wherein the parent genomes are mated by mixing respective parent genome bank order weights.

12. The method according to claim 4, wherein an elite genome and a non-elite genome are employed as parents for a new genome.

13. The method according to claim 4, wherein two genomes comprising at least one of elite and non-elite genomes are randomly selected as parents to create a new genome.

14. A generator for generating an update package comprising difference information for updating at least one of firmware and software in memory of an electronic device, the memory comprising a plurality of banks, the generator comprising:
   at least one processor communicatively coupled to the electronic device, the at least one processor operating to perform a method comprising the steps of, at least:
      determining an optimal bank order for processing images of the memory during generation of difference information, using at least one differential evolution technique employing at least one genetic computation technique comprising:
         creating a new population of genomes;
         evaluating the population of genomes;
         evolving the population of genomes; and
         repeating evaluating and evolving the population at least until:
            a determination is made that there are no other results to be found,
            a threshold is reached, or
            a user cancels generation of the genomes;
      employing the optimal bank order to generate the update package; and
      wherein the optimal bank order makes the update package compact to the greatest degree attainable by the method.

15. The generator according to claim 14, wherein creating a new population comprises:
   adding seeds to the population of genomes, the seeds comprising at least one of a forward bank order seed and a backward bank order seed; and
   filling the population with randomly created genomes.

16. The generator according to claim 14, wherein creating a new population comprises:
   seeding the population of genomes by building a forward bank order for a required number of banks;
   selectively storing a CRC value for the forward bank order for subsequent access;
   placing the forward bank order into the genomes;
   building a reverse order of banks;
   storing the CRC value for the reverse bank order; and
   placing the reverse order of banks into the genomes.

17. The generator according to claim 14, wherein evaluating the population of genomes comprises testing for a best desired outcome.

18. The generator according to claim 17, wherein evaluating the population of genomes comprises at least one of determining weights for the genomes and determining an evaluation function adapted to be employed to compare and selectively order the genomes in the population.

19. The generator according to claim 14, wherein evolving the population of genomes comprises:
   mating parents to create at least one of crossover and mutated genomes; and
   filling the population of genomes with randomly created genomes.

20. The generator according to claim 14, wherein, during the evolving of the population of genomes, two elite genomes are employed as parents for a new genome and a crossover technique is employed after ensuring that both parents are not identical.

21. The generator according to claim 14, wherein an elite genome and a non-elite genome are employed as parents for a new genome.

* * * * *